United States Patent
He

(10) Patent No.: US 9,229,146 B2
(45) Date of Patent: Jan. 5, 2016

(54) BACKLIGHT MODULE

(71) Applicant: SHENZHEN CHINA STAR OPTOELECTRONICS TECHNOLOGY CO., LTD., Shenzhen (CN)

(72) Inventor: Hu He, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 189 days.

(21) Appl. No.: 14/232,910

(22) PCT Filed: Nov. 18, 2013

(86) PCT No.: PCT/CN2013/087309
§ 371 (c)(1),
(2) Date: Jan. 15, 2014

(87) PCT Pub. No.: WO2015/070452
PCT Pub. Date: Jan. 15, 2014

(65) Prior Publication Data
US 2015/0131320 A1    May 14, 2015

(30) Foreign Application Priority Data
Nov. 13, 2013 (CN) .......................... 2013 1 0562360

(51) Int. Cl.
*F21V 7/04* (2006.01)
*F21V 8/00* (2006.01)

(52) U.S. Cl.
CPC .................................. *G02B 6/0011* (2013.01)

(58) Field of Classification Search
CPC .... G02B 6/0011; G02B 6/0038; G02B 6/004; G02B 6/005; G02B 6/0051; G02B 6/0053
USPC .......................... 362/611, 613, 621, 623, 625
See application file for complete search history.

(56) References Cited

U.S. PATENT DOCUMENTS

| | | | | |
|---|---|---|---|---|
| 6,371,623 B1* | 4/2002 | Toyoda | ................ | G02B 6/0013 362/331 |
| 6,582,095 B1* | 6/2003 | Toyoda | ................ | G02B 6/0038 362/23.09 |
| 6,799,859 B1* | 10/2004 | Ida | ........................ | G02B 6/0036 362/335 |
| 2009/0109683 A1* | 4/2009 | Miyashita | ............... | G02B 5/045 362/297 |
| 2010/0142225 A1* | 6/2010 | Kurihara | ............... | G02B 6/0036 362/621 |
| 2012/0081926 A1* | 4/2012 | Yu | ........................ | G02B 6/0016 362/619 |

* cited by examiner

*Primary Examiner* — Ali Alavi
(74) *Attorney, Agent, or Firm* — Mark M. Friedman

(57) ABSTRACT

A backlight module including a light guide plate is disclosed. The light guide plate has a light emitting plane, a bottom plane opposite to the light emitting plane and a light incident plane connecting the light emitting plane and the bottom plane, a plurality of arc protrusions disposed on the first light incident plane; and a transparent layer disposed upon each of the arc-protrusions. In the backlight module, an LED bar is disposed near to the light incident plane of the light guide plate, and the LED bar has a plurality of LED light sources corresponding to the arc-protrusions of the light guide plate, respectively.

19 Claims, 4 Drawing Sheets

BACKLIGHT MODULE

BACKGROUND OF THE INVENTION

1. Field of Invention

The present invention relates to a backlight module of a liquid crystal display (LCD), and more particularly, to a light guide plate with a plurality of arc-protrusions on a light incident plane.

2. Description of Prior Art

The design of an LED's backlight is improved along with the improvement of LED's efficiency, from the earliest four-side type into a two-side type, and then into a one-side type, the present technology and the direction of future development focus on a single-short-side type.

With the development of 3D technology, a TV with a 3D display function is also gradually becoming a mainstream. Currently the 3D display modes include shutter (Shutter Glass), polarized FPR (Film-type Patterned Retarder) and other manners.

Shutter-style 3D needs to be achieved by the scanning backlight with a panel pixel scanning. Backlight sources are usually partitioned. LEDs of an edge back-lit style LED light bar are divided into sets to correspond to a plurality of sub-sections of a screen. When the first frame signal scans the first subsection, the LEDs corresponding to the first subsection are lighted up, and the rest of the LEDs are turned off. When the signal scans the second subsection, only the LEDs corresponding to the second subsection are lighted up. The rest can be deduced accordingly. Such operations are necessary to be conducted for every frame. The display performance of the shutter-style 3D depends on a crosstalk between the subsections and timing setting.

The crosstalk between the subsections related to the backlight mainly comes from the effect of the brightnesses of the different subsections. In the best situation, when the LEDs correspond to one subsection are lighted up, the backlight sources of the other subsections all present a dark mode. FIG. 1 is a side-view of a light guide plate with microstructures of a prior art. It is a common design to dispose saw-shaped microstructures 13 on the light emitting plane 11 of the light guide plate 10. The microstructures 13 on the light guide plate 10 destroy the condition of light total reflection with different geometric shapes. FIG. 2 is a light distribution diagram of a flat light guide plate of a prior art and a light guide plate with wave-shaped micro structures of a prior art. It is clearly observed that the light guide plate with wave-shaped micro structures has a more convergent light distribution than the flat light guide plate, but in practice, it is impossible to restrain the divergence of light with only micro structures.

Further refer to FIG. 3, which is a vertical direction brightness distribution diagram when a common light guide plate with micro structures is lighted up in one LED light source. The width corresponds to the light source (100% brightness) is a point, the width of FWHM (Full Width at Half Maximum; 50% brightness) apparently increases. With further refer to FIG. 4, which is a diagram showing the width of FWHM at different distances from the light source. In a single-short-side edge-lit manner, as the distance increases, the FWHM increases accordingly, which means the crosstalk is more serious at a far side than a light incident side of the single-short-side edge-lit light guide plate.

The prior art prevents the divergence of light by forming microstructures as convex lens with the material of light guide plate per se. However, when improving the convergence of light, the increase of width and height of the light guide plate due to the microstructures is disadvantageous to the backlight structure design.

BRIEF SUMMARY OF THE INVENTION

The purpose of the present invention is to provide a backlight module prevents the light from over divergent and causing crosstalk.

To achieve above purpose. The present invention provides a light guide plate, comprising a light emitting plane, a bottom plane opposite to the light emitting plane, and a first light incident plane connecting the light emitting plane and the bottom plane, a plurality of arc-protrusions disposed on the first light incident plane; a transparent layer disposed upon each one of the arc-protrusions; and a first LED bar disposed near to the first light incident plane of the light guide plate, and the rust LED bar having a plurality of LED light sources corresponding to the arc-protrusions; respectively, a center of each arc-protrusion aligns with a center of the LED light source corresponding thereto, and the thickness of the arc-protrusion decreases from the center to an edge of the arc-protrusion.

The thickness of the transparent layer decreases from a center to an edge of the transparent layer corresponding to the center of the arc-protrusion.

A refraction of the light guide plate is larger or equal to a refraction of the transparent layer, and the refraction of the transparent layer is larger or equal to a refraction of air.

The light guide plate comprises a plurality of scattering dots, and the scattering dots are disposed on at least one of the light emitting plane or the bottom plane.

The scattering dots being long-shaped micro structures, the micro structures being concave inward from at least one of the light emitting plane or the bottom plane.

The long-shaped micro structure has a depth of 20-200 μm, a width of 30-200 μm, and a length of 200-1200 μm.

A long direction of the scattering dots is parallel to the direction of the first LED bar.

In the other embodiment of the present invention, wherein a long direction of the scattering dots is perpendicular to the direction of the first LED bar.

The light guide plate further comprises a second light incident plane connecting the light emitting plane and the bottom plane, and opposite to the first light incident plane, a plurality of arc-protrusion disposed on the second light incident plane, the transparent layer disposed upon the arc-protrusion; and the backlight module further comprises a second LED bar, a second LED bar disposed near to the second light incident plane of the light guide plate, the second LED bar has a plurality of LED light sources corresponding to the arc-protrusion.

To achieve above purpose. The present invention provides A backlight module, comprising: a light guide plate, comprising a light emitting plane, a bottom plane opposite to the light emitting plane and a first light incident plane connecting the light emitting plane and the bottom plane, a plurality of arc-protrusion disposed on the first light incident plane; a transparent layer disposed upon the arc-protrusion; and a first LED bar disposed near to the first light incident plane of the light guide plate, the first LED bar having a plurality of LED light sources corresponding to the arc-protrusion.

A center of each arc-protrusion aligns with a center of the LED light source corresponding thereto, and the thickness of the arc-protrusion decreases from the center to an edge of the are-protrusion.

The thickness of the transparent layer decreases from a center to an edge of the transparent layer corresponding to the center of the arc-protrusion.

A refraction of the light guide plate is larger or equal to a refraction of the transparent layer, and the refraction of the transparent layer is larger or equal to a refraction of air.

The light guide plate comprises a plurality of scattering dots, the scattering dots are disposed on at least one of the light emitting plane or the bottom plane.

The scattering dots being long-shaped micro structures, the micro structures being concave inward from at least one of the light emitting plane or the bottom plane.

The long-shaped micro structure has a depth of 20-200 μm, a width of 30-200 μm, and a length of 200-1200 μm.

A long direction of the scattering dots is parallel to the direction of the first LED bar.

In the other embodiment of the present invention, wherein a long direction of the scattering dots is perpendicular to the direction of the first LED bar.

The light guide plate further comprises a second light incident plane connecting the light emitting plane and the bottom plane, and opposite to the first light incident plane, a plurality of arc-protrusion disposed on the second light incident plane, the transparent layer disposed upon the arc-protrusion; and the backlight module further comprises a second LED bar, a second LED bar disposed near to the second light incident plane of the light guide plate, the second LED bar has a plurality of LED light sources corresponding to the arc-protrusion.

With the technology proposal of the present invention, the advantage effect is to regulate the direction of light, focus the light into the light guide plate and lower the crosstalk between subsections by the structure design and application of different thickness of transparent layer.

DETAILED DESCRIPTION OF THE PREFERRED EMBODIMENTS

Figure 1:
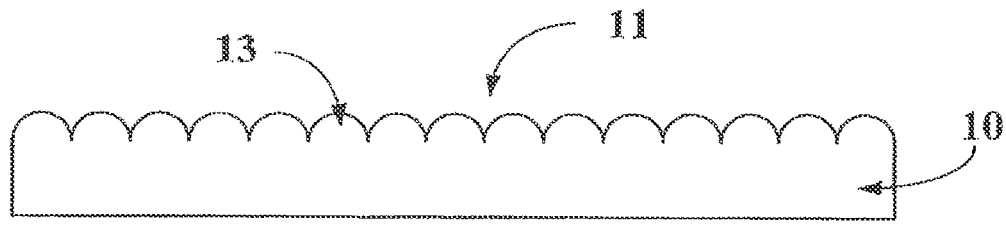
FIG. 1 is a side-view of a light guide plate with micro structures of a prior art.
Figure 2:
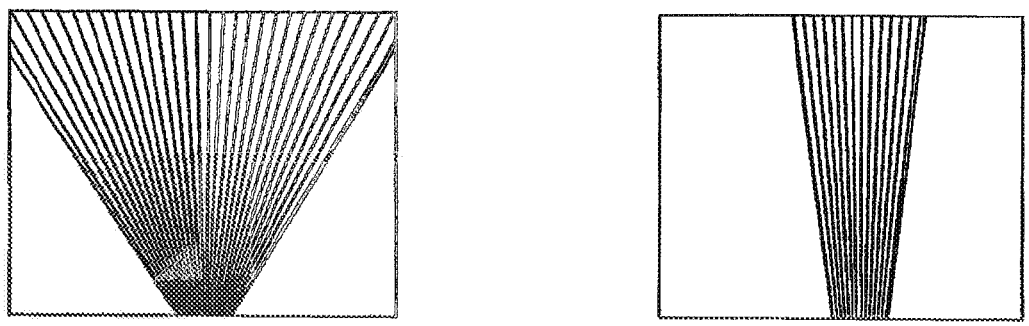
FIG. 2 is a light distribution diagram of a flat light guide plate of a prior art and a light guide plate with wave-shaped micro structures of a prior art.
Figure 3:
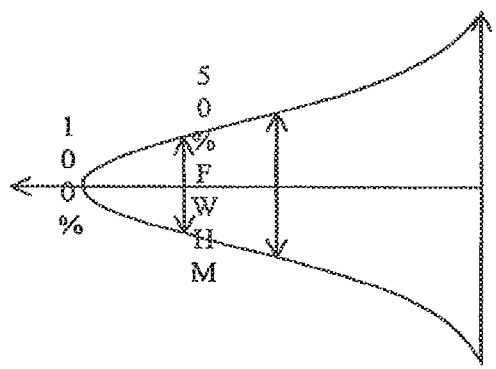
FIG. 3 is a vertical direction brightness distribution diagram when a common light guide plate with micro structures lights up in one subsection.
Figure 4:
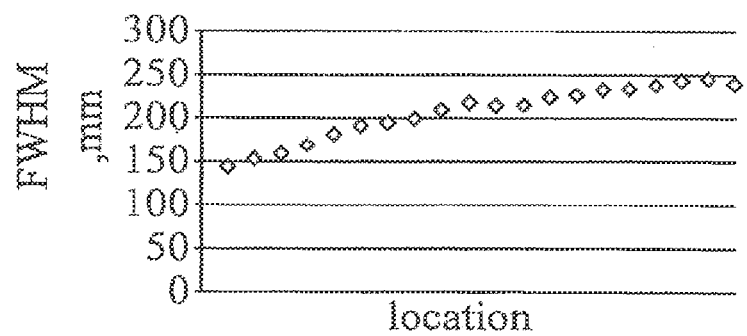
FIG. 4 is a diagram showing the width of FWHM at different distances.

The following description of every embodiment, with reference to the accompanying drawings, is used to exemplify a specific embodiment which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention. In the drawings, the components having similar structures are denoted by the same numerals.

Figure 5:
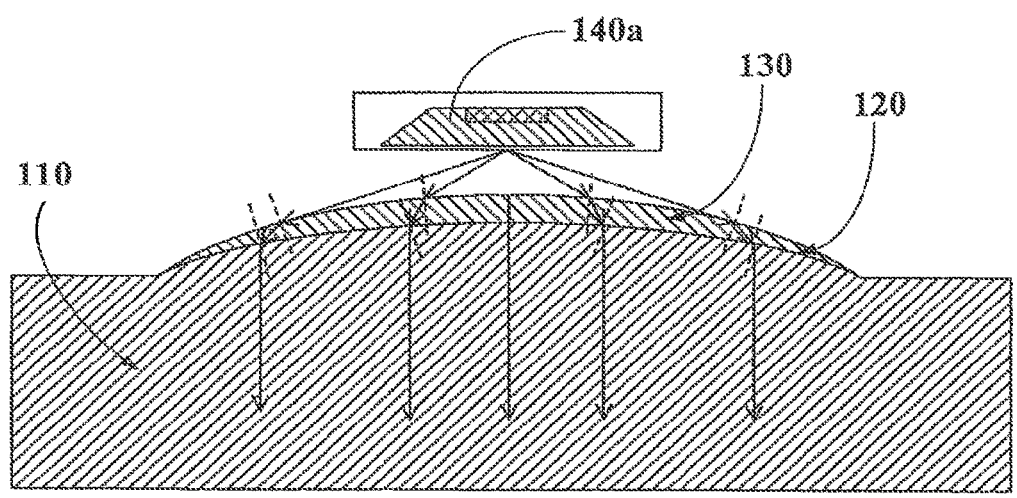
FIG. 5 is a partial structure diagram of the light guide plate corresponding to one LED light source from the light source.
Figure 6:
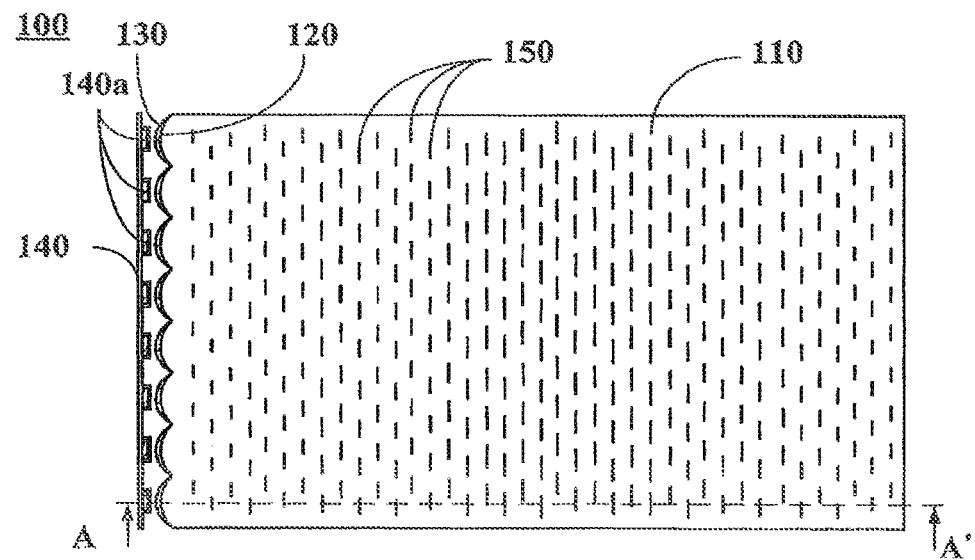
FIG. 6 is a top view of a backlight module of a first embodiment of the present invention.
Figure 7:
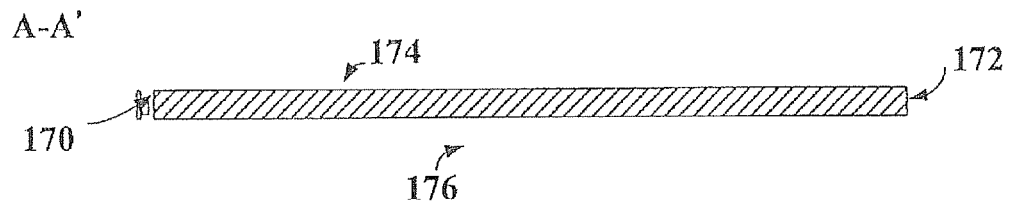
FIG. 7 is a section view along A-A' of FIG. 6.

Refer to FIG. 5, FIG. 6 and FIG. 7, FIG. 5 is a partial structure diagram of the light guide plate corresponding to one LED light source, FIG. 6 is a top view of a backlight module of a first embodiment of the present invention, FIG. 7 is a section view along A-A' of FIG. 6. According to the first embodiment of the present invention, a backlight module 100 comprises a light guide plate 110, a first LED light bar 140.

A light guide plate 110, comprising a light emitting plane 174, a bottom plane 176 opposite to the light emitting plane 176 and a first light incident plane 170 connecting the light emitting plane 174 and the bottom plane 176, a plurality of arc-protrusion 120 disposed on the first light incident plane 170; a transparent layer 130 disposed upon the arc-protrusion 120.

Wherein a center of each arc-protrusion 120 aligns with a center of the LED light source 142a corresponding thereto, and the thickness of the arc-protrusion 120 decreases from the center to an edge of the arc-protrusion; at the same time, wherein the thickness of the transparent layer 130 decreases from a center to an edge of the transparent layer corresponding to the center of the arc-protrusion 120 to form a structure like a lens, making the light from the LED could do a first refraction on the transparent layer 130 and a second refraction on the arc-protrusion 120 on the first light incident plane 170. Wherein a refraction of the light guide plate 110 is larger or equal to a refraction of the transparent layer 130, and the refraction of the transparent layer 130 is larger or equal to a refraction of air, making the light much more focus without divergence.

The light guide plate 110 further comprises a plurality of scattering dots 150; the scattering dots 150 are disposed on the bottom plane 176 of the light guide plate 110 and parallel to the first LED bar 140 to prevent the divergence of light by breaking the reflection condition of light.

Figure 8:
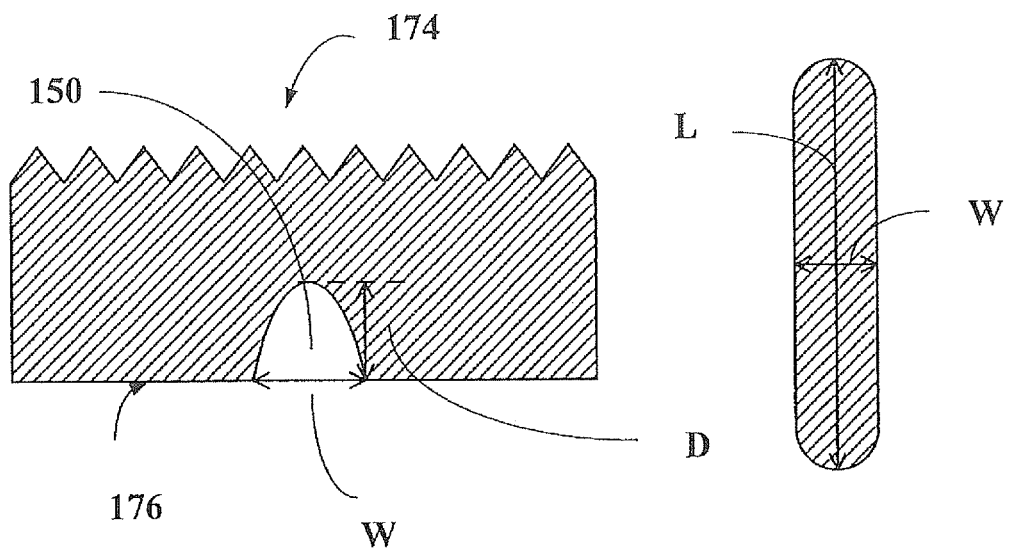
FIG. 8 is an illustrating drawing of the scatter dot of a first embodiment of the present invention.

FIG. 8 is an illustrating drawing of the scatter dot of a first embodiment of the present invention, Disposing a plurality of scatter dots 150 on the bottom plane 176 of the light guide plate 110 and disposing saw-shaped micro structures of a prior art on the light emitting plane 174. Please note that the function of the saw-shaped micro structures is the same as the wave-shaped micro structures mentioned above, the saw-shaped micro structures are for reference only, not to limit disposing any conventional micro structures. The scatter dots 150 are enforced in long-shaped and concave micro structure. Preferably, with a depth of 20-200 μm, a width of 30-200 μm, a length of 200-1200 μm.

Figure 9:
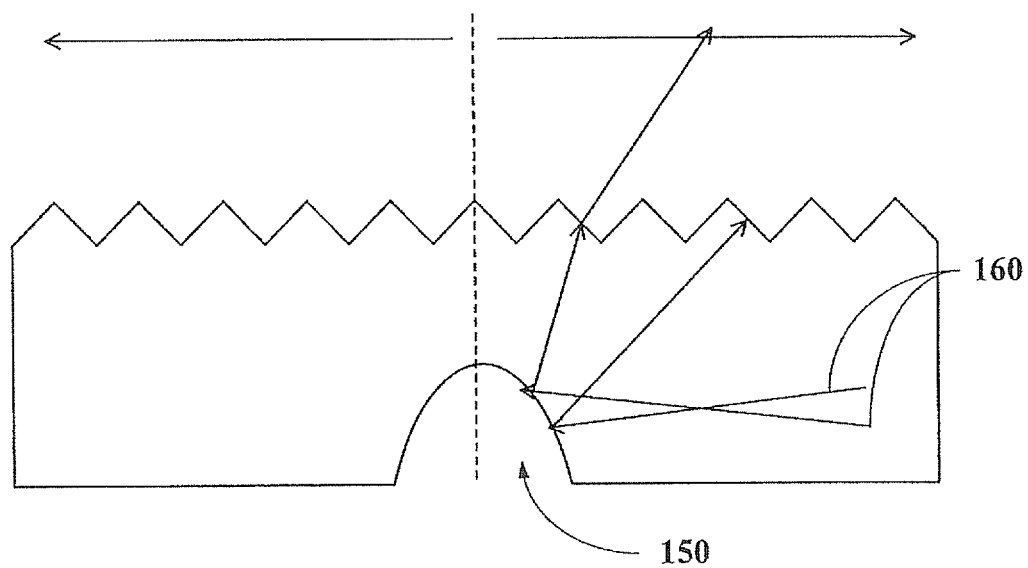
FIG. 9 is an illustrating view drawing of reflecting path of light of a first embodiment of the present invention.

FIG. 9 is an illustrating view drawing of reflecting path of light of a first embodiment of the present invention. With the arrangement of the length, width and depth of the scatter dots 150, making the light 160 still perpendicular to the scatter dots 150 after reflecting on the scatter dots 150 without destroying the regulated direction of light 160 passing through the first light incident plane (not shown), comparing with the prior art, the light guide plate of the first embodiment of the present invention converges the light, lowers the divergence of light and crosstalk by 2 steps refraction of light.

Figure 10:
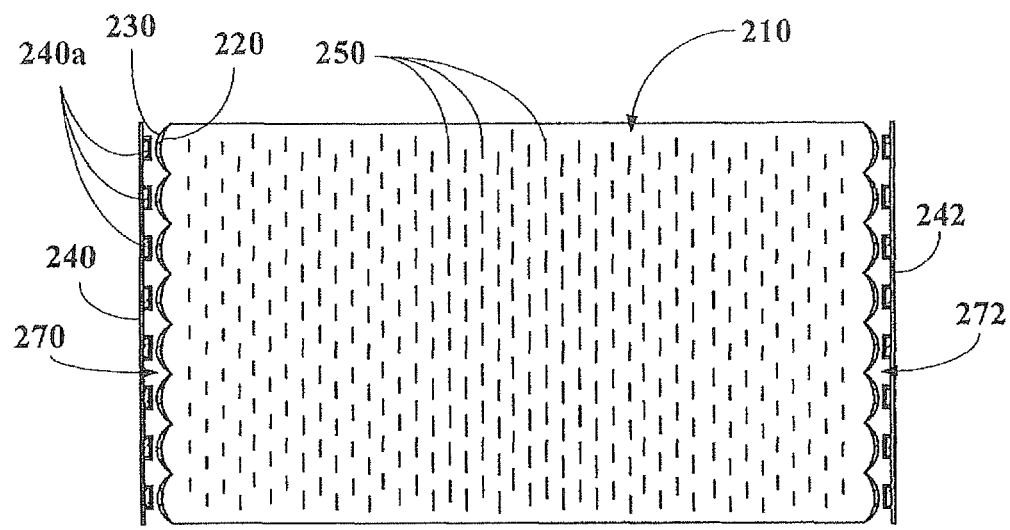
FIG. 10 is a top view drawing of the backlight module of a second embodiment of the present invention.

FIG. 10 is a top view drawing of the backlight module of a second embodiment of the present invention. The difference between the second embodiment of the present invention and the first embodiment of the present invention is the backlight module 200 with an additional second LED bar 242, a light guide plate 210 further comprises a plurality of arc-protrusion 220 disposed on the second light incident plane 272, and a transparent layer 230 accordingly. Comparing A two-sides backlight module to the first embodiment of the present invention, the crosstalk caused at the far side (near a second light incident plane 272) by a first LED bar 240 could be lowered by disposing the second LED bar 242; in contrast, the crosstalk caused at the far side (near a first light incident plane 270) by the second LED bar 242 could be lowered by disposing the first LED bar 240, achieving a better display effect.

Figure 11:
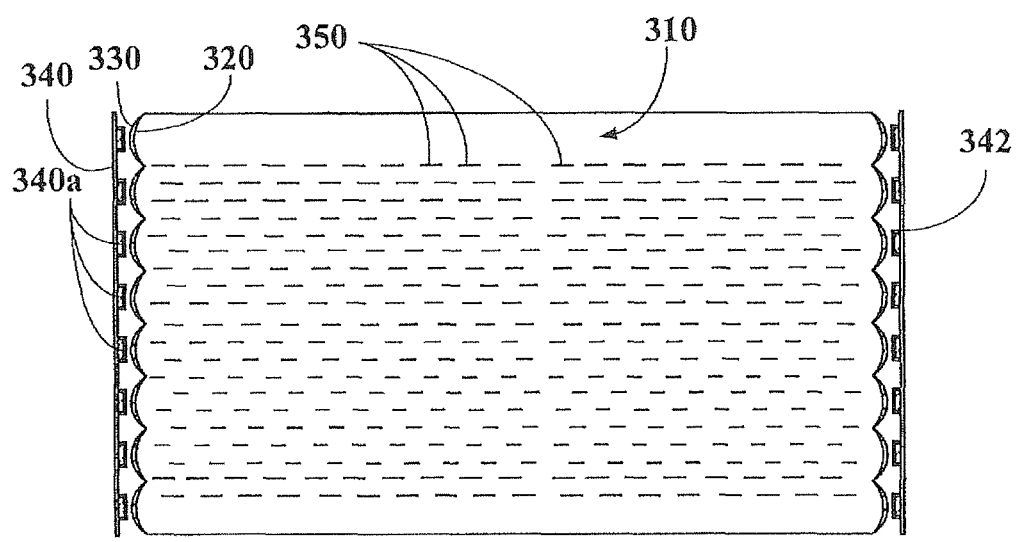
FIG. 11 is a top view drawing of the backlight module of a third embodiment of the present invention.

FIG. 11 is a top view drawing of the backlight module of a third embodiment of the present invention. The difference between the third embodiment of the present invention and the second embodiment of the present invention is disposing a plurality of long-shaped scatter dots 350 perpendicular to a first LED bar 340 on a light emitting plane 374. Comparing the backlight module and the second embodiment of the present invention, making the light of each subsections much more convergent by disposing the scatter dots 350 perpendicular to a first LED bar 340 on a light emitting plane 374.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A backlight module comprising:
a light guide plate having a light emitting plane, a bottom plane opposite to the light emitting plane, and a first light incident plane connecting the light emitting plane and the bottom plane, and a plurality of arc-protrusions disposed on the first light incident plane;
a transparent layer disposed upon each one of the arc-protrusions; and
a first LED bar disposed near to the first light incident plane of the light guide plate, and the first LED bar having a plurality of LED light sources corresponding to the arc-protrusions, respectively, a center of each arc-protrusion aligns with a center of the LED light source corresponding thereto, and the thickness of the arc-protrusion decreases from the center to an edge of the arc-protrusion.

2. The backlight module according to claim 1, wherein the thickness of the transparent layer decreases from a center to an edge of the transparent layer corresponding to the center of the arc-protrusion.

3. The backlight module according to claim 1, wherein a refraction of the light guide plate is larger or equal to a refraction of the transparent layer, and the refraction of the transparent layer is larger or equal to a refraction of air.

4. The backlight module according to claim 1, wherein the light guide plate comprises a plurality of scattering dots, and the scattering dots are disposed on at least one of the light emitting plane or the bottom plane.

5. The backlight module according to claim 4, Wherein the scattering dots being long-shaped micro structures, the micro structures being concave inward from at least one of the light emitting plane or the bottom plane.

6. The backlight module according to claim 5, wherein the long-shaped micro structure has a depth of 20-200 μm, a width of 30-200 μm, and a length of 200-1200 μm.

7. The backlight module according to claim 6, wherein a long direction of the scattering dots is parallel to the direction of the first LED bar.

8. The backlight module according to claim 6, wherein a long direction of the scattering dots is perpendicular to the direction of the first LED bar.

9. The backlight module according to claim 1, wherein the light guide plate further comprises a second light incident plane connecting the light emitting plane and the bottom plane, and opposite to the first light incident plane, a plurality of arc-protrusion disposed on the second light incident plane, the transparent layer disposed upon the arc-protrusion; and the backlight module further comprises a second LED bar, a second LED bar disposed near to the second light incident plane of the light guide plate, the second LED bar has a plurality of LED light sources corresponding to the arc-protrusion.

10. A backlight module comprising:
a light guide plate having a light emitting plane, a bottom plane opposite to the light emitting plane and a first light incident plane connecting the light emitting plane and the bottom plane, a plurality of arc-protrusion disposed on the first light incident plane;
a transparent layer disposed upon the arc-protrusion; and
a first LED bar disposed near to the first light incident plane of the light guide plate, the first LED bar having a plurality of LED light sources corresponding to the arc-protrusions.

11. The backlight module according to claim 10, wherein a center of each arc-protrusion aligns with a center of the LED light source corresponding thereto, and the thickness of the arc-protrusion decreases from the center to an edge of the arc-protrusion.

12. The backlight module according to claim 10, wherein the thickness of the transparent layer decreases from a center to an edge of the transparent layer corresponding to the center of the arc-protrusion.

13. The backlight module according to claim 10, wherein a refraction of the light guide plate is larger or equal to a refraction of the transparent layer, and the refraction of the transparent layer is larger or equal to a refraction of air.

14. The backlight module according to claim 10, wherein the light guide plate comprises a plurality of scattering dots, the scattering dots are disposed on at least one of the light emitting plane or the bottom plane.

15. The backlight module according to claim 14, Wherein the scattering dots being long-shaped micro structures, the micro structures being concave inward from at least one of the light emitting plane or the bottom plane.

16. The backlight module according to claim 15, wherein the long-shaped micro structure has a depth of 20-200 μm, a width of 30-200 μm, and a length of 200-1200 μm.

17. The backlight module according to claim 15, wherein a long direction of the scattering dots is parallel to the direction of the first LED bar.

18. The backlight module according to claim 15, wherein a long direction of the scattering dots is perpendicular to the direction of the first LED bar.

19. The backlight module according to claim 10, wherein the tight guide plate further comprises a second light incident plane connecting the light emitting plane and the bottom plane, and opposite to the first light incident plane, a plurality of arc-protrusion disposed on the second light incident plane, the transparent layer disposed upon the arc-protrusion; and the backlight module further comprises a second LED bar, a second LED bar disposed near to the second light incident plane of the light guide plate, the second LED bar has a plurality of LED light sources corresponding to the arc-protrusion.

* * * * *